(12) United States Patent
Yang et al.

(10) Patent No.: US 12,693,414 B2
(45) Date of Patent: Jul. 28, 2026

(54) DOUBLE-END LASER RANGEFINDER

(71) Applicant: Shenzhen Mileseey Technology Co., LTD., Shenzhen (CN)

(72) Inventors: Jianjie Yang, Shenzhen (CN); Jiefeng Huang, Shenzhen (CN); Xiaori He, Shenzhen (CN); Jingzhuo Huang, Shenzhen (CN); Zhi Chou, Shenzhen (CN)

(73) Assignee: SHENZHEN MILESEEY TECHNOLOGY CO., LTD., Shenzhen (CN)

( * ) Notice: Subject to any disclaimer, the term of this patent is extended or adjusted under 35 U.S.C. 154(b) by 665 days.

(21) Appl. No.: 18/311,901

(22) Filed: May 4, 2023

(65) Prior Publication Data

US 2023/0408690 A1 Dec. 21, 2023

(30) Foreign Application Priority Data

Jun. 15, 2022 (CN) .......................... 202221485370.5

(51) Int. Cl.
| | |
|---|---|
| *G01S 17/08* | (2006.01) |
| *G01S 7/481* | (2006.01) |
| *G01S 7/51* | (2006.01) |

(52) U.S. Cl.
CPC ............ *G01S 17/08* (2013.01); *G01S 7/4812* (2013.01); *G01S 7/4814* (2013.01); *G01S 7/51* (2013.01)

(58) Field of Classification Search
CPC ...... G01S 17/08; G01S 7/4812; G01S 7/4814; G01S 7/51; G01S 17/87; G01S 7/4813
See application file for complete search history.

(56) References Cited

U.S. PATENT DOCUMENTS

| | | | |
|---|---|---|---|
| 2007/0205285 A1* | 9/2007 | Tan ..................... | G06K 7/10831 |
| | | | 235/462.49 |
| 2013/0094026 A1* | 4/2013 | Kuznia .................... | G02B 6/32 |
| | | | 385/33 |
| 2013/0162970 A1* | 6/2013 | Dang ...................... | G01S 17/08 |
| | | | 356/4.01 |
| 2015/0309163 A1* | 10/2015 | Van Der Velde ..... | G01S 7/4813 |
| | | | 250/214.1 |
| 2019/0041515 A1* | 2/2019 | Haruguchi ............ | G01S 7/4817 |

FOREIGN PATENT DOCUMENTS

| | | | |
|---|---|---|---|
| CN | 210864032 U | * | 2/2020 |
| CN | 212808620 U | * | 3/2021 |

* cited by examiner

*Primary Examiner* — Md Saiful A Siddiqui

(74) *Attorney, Agent, or Firm* — Andrew C. Cheng

(57) ABSTRACT

A double-end laser rangefinder includes a ranging board, a control board, a key board which are integrated to form a mainboard. Two lens mounting bases are coaxially mounted at two ends of a main frame. First end and second end with lens-mounting bases are coaxially mounted in the main frame. Two lens groups are mounted on the two lens-mounting bases respectively. Each lens group includes a transmitting lens and a receiving lens. The receiving lenses on the first end and the second end are coaxial, the transmitting lenses on the first end and the second end are also coaxial. Coaxial arrangement of light paths of the two transmitting lenses and the two receiving lenses is realized through the main frame.

20 Claims, 10 Drawing Sheets

1

DOUBLE-END LASER RANGEFINDER

FIELD

The present application relates to the field of laser ranging, in particular to a double-end laser rangefinder.

BACKGROUND

When a traditional single-end rangefinder is used for ranging, one plane in space should be used as a measurement datum. The measurer first finds the datum plane, such as a wall, and places the single-end rangefinder with its tail abutting against the wall, and then the head of the single-end rangefinder emits a ranging laser beam to another wall on the opposite side of a room to accurately measure the range between the two walls. When the single-end rangefinder is used to measure the height of a house, the measurer needs to squat down to place the tail of the single-end rangefinder on the ground, and then the head of the single-end rangefinder emits a ranging laser beam towards the ceiling. However, it is difficult to make the laser rangefinder abut against a datum plane on some occasions such as the plane is too narrow or too distant.

Double-end rangefinders overcome the limitation that a single-end rangefinder must abut against a datum plane when measuring, and can be placed at any point in space between the datum plane and the target plane. The double-end rangefinder emits ranging two laser beams in a line to the objects on its both sides, for instance a datum plane and a target plane, to measure the straight range between the two objects, and the rangefinder can also determine the 1D/2D/3D spatial coordinates of the measurer by once/double/triple application(s) in a space. The double-end rangefinder can work as a single-end rangefinder as well if one end is turn-off. Therefore, the double-end rangefinders have more functions, suitable for more occasions, and can be used as a ranging module to perform spatial positioning for industrial automation.

In a traditional split-type double-end laser rangefinder, two light mechanisms are separately mounted on two main frames. As shown in FIG. 1, the upper combination of an upper shell 100 and an upper single-end rangefinder consisted of a first mainboard 310 and a first light mechanism 320, is assembled onto the lower combination of a lower shell 200 and a lower single-end rangefinder made of a first mainboard 330 and a second light mechanism 340, all together to form a traditional split-type double-end laser rangefinder. However, by adoption of this traditional structural design, if the optical axes of the two light mechanisms, 320 and 340, are not parallel when the two light mechanisms are imperfectly assembled, that is, the optical axes of the two light mechanisms deviate from each other, thus large measurement errors will be caused. Adjusting the two light mechanisms to be coaxial is time consuming and makes production less efficient. During laser rangefinder's years of long-term use, the two optical axes may gradually deviate from each other again due to the aging of securing glue, or under the action of external forces such as falling and shaking, thus worsen the measurement accuracy.

SUMMARY

In the view of this, it is necessary to provide a double-end laser rangefinder which is more stable, more reliable to use and easier to produce.

In one aspect, the present application provides the new design of a double-end laser rangefinder, including a main frame, a mainboard mounted to the main frame, a one-piece optical mechanism provided in the main frame, and two lens-mounting bases. The one-piece optical mechanism includes a first end and a second end integrally formed as a one-piece structure. One of the two lens-mounting bases is placed on the first end, and the other of the two lens-mounting bases is placed on the second end. Two lens groups are mounted on the two lens-mounting bases respectively and the two lens groups are coaxial with each other.

Compared with a traditional split-type double-end laser rangefinder, the double-end laser rangefinder provided by the present application has the advantage that coaxial adjustment of two light mechanisms during production is no more needed, and cable connection and board installation can be simplified by optimizing the circuit design of mainboard, and welding work is also reduced, all contributing to improved production efficiency and passing rate. Light mechanisms at two ends can be kept coaxial by thick and strong main frame rather than a thin layer of glue during long-term use, so the measurement accuracy is guaranteed.

BRIEF DESCRIPTION OF THE DRAWINGS

The following provides a clear and complete description of technical solutions according to embodiments of the present application, with reference to the drawings of the embodiments of the present application. It is obvious that the embodiments so described demonstrate only some, but not all, of the ways for embodying the present application. All other embodiments that are contemplated by those having ordinary skill in the art, without casting creative endeavor are considered falling in the scope of protection for the present application.

Figure 1:
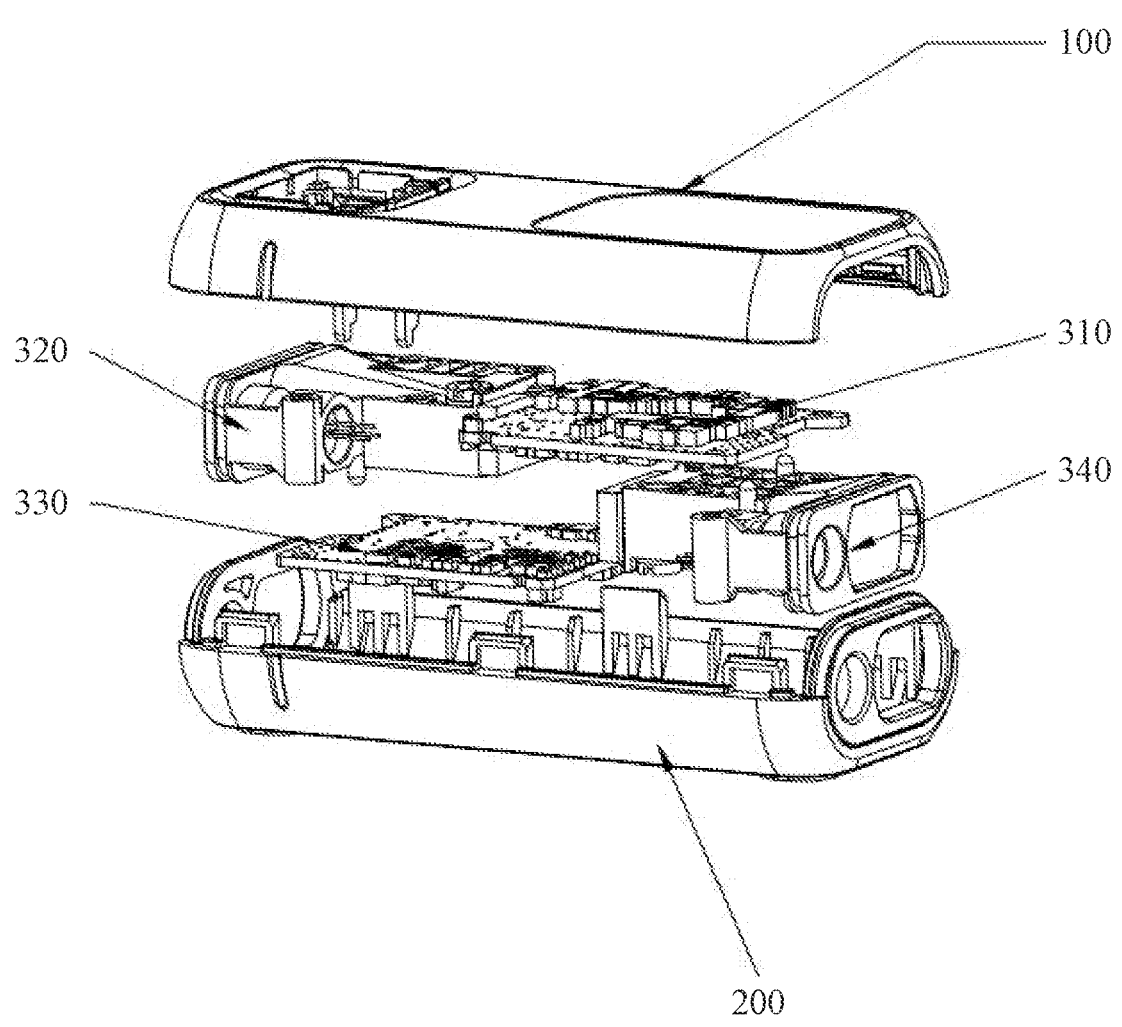
FIG. 1 is an exploded structural view of a traditional split-type double-end laser rangefinder.

Reference signs: 100, upper shell; 200, lower shell; 310, first mainboard; 320, first light mechanism; 330, second mainboard; 340, second light mechanism; 400, shell; 410, key hole; 420, screen hole; 430, shell cover; 500, main frame; 600, mainboard; 700, one-piece light mechanism; 710, first end; 720, second end; 730, laser; 800, lens group; 810, transmitting lens; 820, receiving lens; 830, lens mounting base; 840, optical axis; 850, laser marking module; 860, charging port; 900, building; 910, single-end rangefinder; 920, first ranging laser light; 930, double-end laser rangefinder; 940, second ranging laser light; 950, third ranging laser light; 960, fourth ranging laser light.

DESCRIPTION OF THE EMBODIMENTS

To make the above objective, features and advantages of the application clear and easily understood, specific embodiments of the application will be described in detail below in conjunction with the accompanying drawings. Many specific details are expounded in the following description to obtain a full understanding of the application. The application can also be implemented in many other ways different from those described here. Skilled technicians in the art can make similar improvements without departing from the concept of the application, so the application is not limited by the specific embodiments disclosed below.

It should be noted that when one element is referred to as being "fixed" or "disposed" on the other element, it may be arranged on the other element directly or through an intermediate element. When one element is referred to as being "connected to" the other element, it may be connected to the other element directly or through an intermediate element. Terms such as "vertical", "horizontal", "upper", "lower", "left", "right" and similar expressions in the description of the application are merely for a descriptive purpose, and do not indicate a unique implementation.

In addition, terms "first" and "second" are merely for a descriptive purpose, and should not be construed as indicating or implying relative importance, or implicitly indicating the number of technical features referred to. When a feature is defined by "first" or "second", it may explicitly or implicitly indicate that at least one said feature is included. In the description of the application, "multiple" refers to at least two such as two or three, unless otherwise expressly defined.

In this application, unless otherwise expressly stated and defined, when a first feature is expressed as being "over" or "under" a second feature, the first feature may directly contact the second feature, or the first feature may indirectly contact the second feature through an intermediate medium. When the first feature is expressed as being "above" a second feature, the first feature may be right above the second feature or obliquely above the second feature, or it merely indicates that the level of the first feature is greater than that of the second feature. When a first feature is expressed as being "below" a second feature, the first feature may be right below the second feature or obliquely below the second feature, or it merely indicates that the level of the first feature is less than that of the second feature.

Unless otherwise defined, all technical and scientific terms used in the description of the application have meanings commonly understood by those skilled in the art. Terms used in the description of the application are merely for the purpose of describing specific embodiments, and are not intended to limit the application. The term "and/or" used in the description of the application includes any one and all combinations of one or more relating items listed.

The application discloses a double-end laser rangefinder, which includes all or part of structures of the following embodiments, that is, the double-end laser rangefinder includes all or parts of the following technical features. A double-end laser rangefinder according to an embodiment of the application includes a ranging board, a control board, a key board, a display screen, a main frame, a one-piece and two-end optical mechanism, and two lens groups, wherein the ranging board, the control board and the key board are integrated to form a mainboard which is mounted to the main frame. The display screen is mounted on the main frame and is electrically connected to the mainboard. The one-piece and two-end optical mechanism includes a first end and a second end which are coaxially mounted on the main frame, such that coaxial arrangement of laser paths is realized and guaranteed by the main frame. The main frame is provided with two coaxial lens mounting bases. The two lens groups are mounted in the two mounting bases in a one-to-one corresponding manner. Each of the lens groups includes a transmitting lens and a receiving lens, and coaxial arrangement of laser paths of the two transmitting lenses and the two receiving lenses is realized by the main frame. It should be noted that the transmitting lens may be a single lens or a lens group including two or more lenses, and the receiving lens may also be a single lens or a lens group including two or more lenses. Firstly, the double-end laser rangefinder overcomes the inconvenient use that traditional single-end rangefinders must cling to a datum plane. Secondly, compared with a traditional split-type double-end laser rangefinder, the double-end laser rangefinder provided by the application has the advantage that by optimizing the circuit design of mainboard, cable connection and board installation can be simplified and welding work is also reduced. And coaxial adjustment of two light mechanisms for traditional split-type double-end laser rangefinder is no more needed for present application. Therefore, both production efficiency and passing rate are improved. Light mechanisms at two ends can be firmly kept coaxial by thick and strong one-piece frame during long-term use, so the measurement accuracy is guaranteed.

Figure 2:
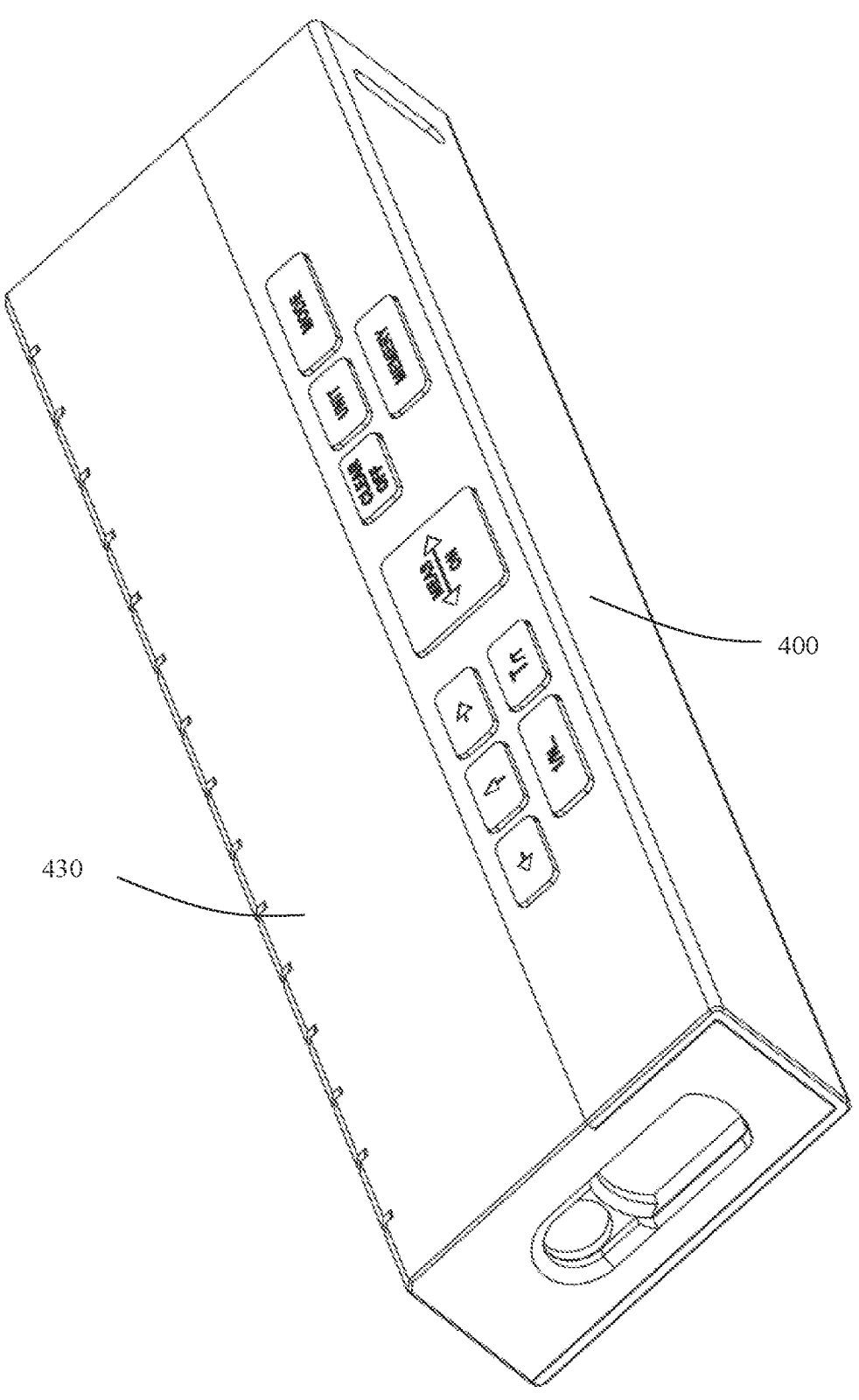
FIG. 2 illustrates a perspective view of a double-end laser rangefinder according to an embodiment of the application.
Figure 3:
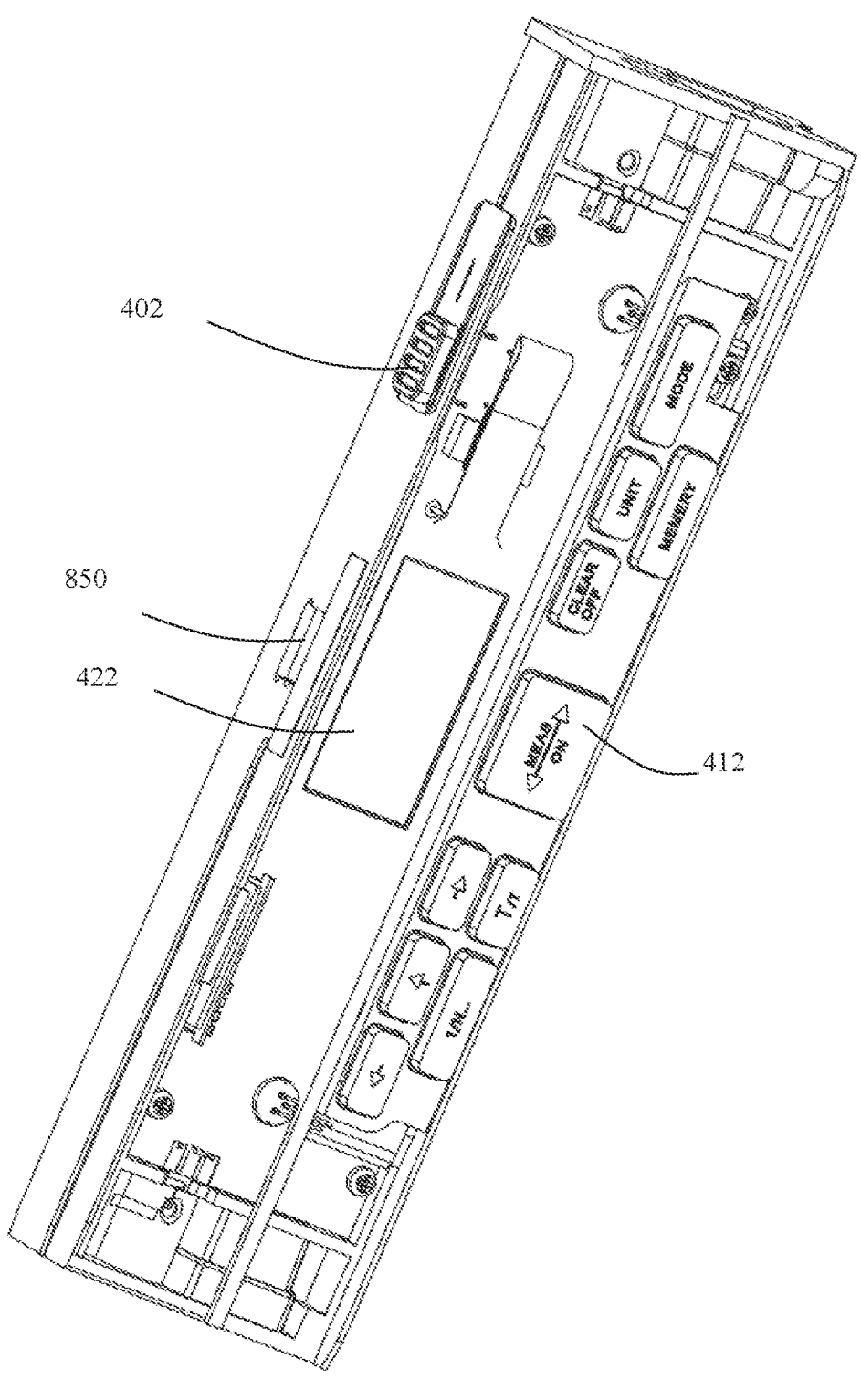
FIG. 3 illustrates another perspective view of the double-end laser rangefinder of FIG. 2, a portion of the shell cover being removed for showing internal components.
Figure 4:
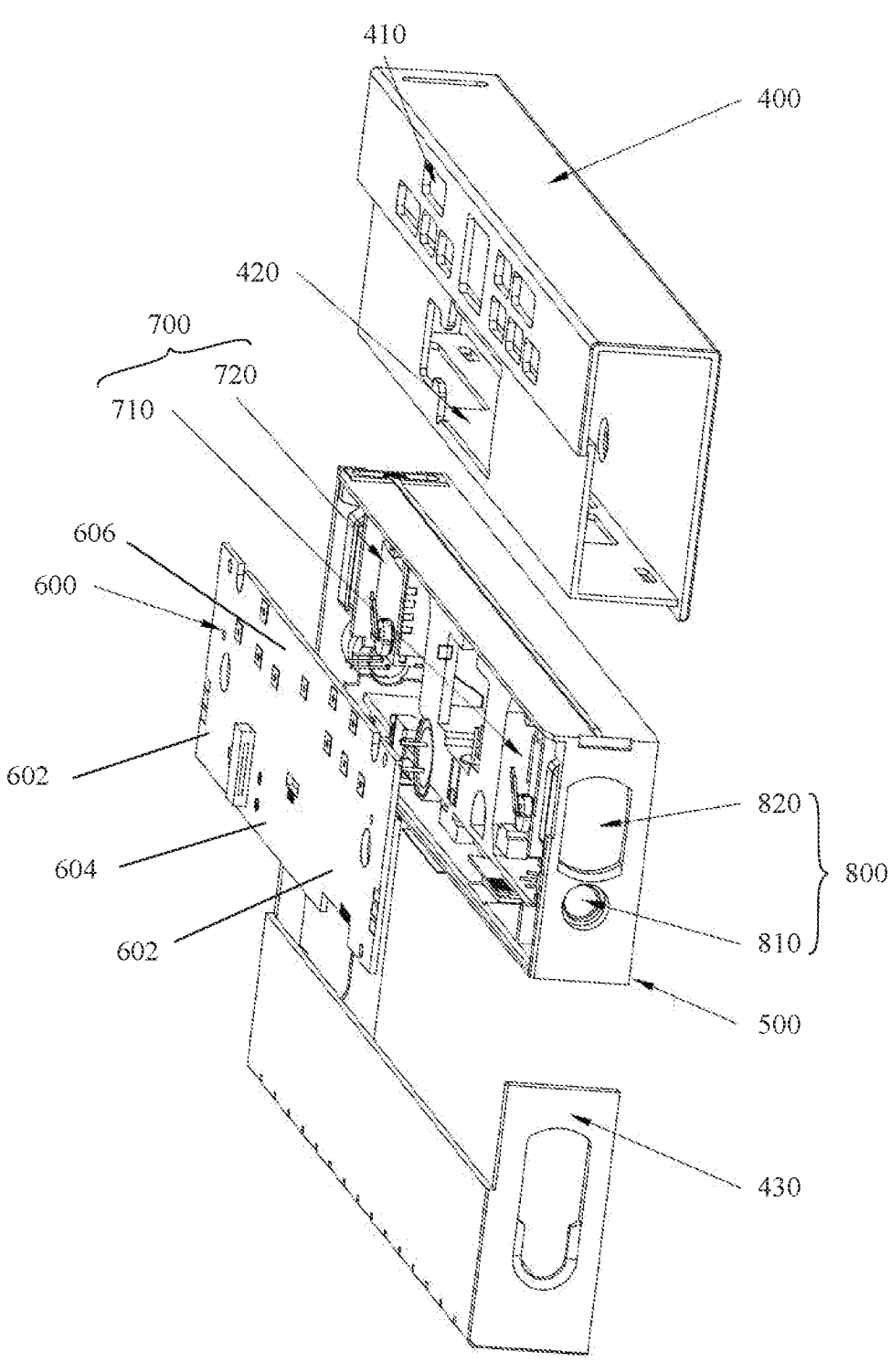
FIG. 4 is an exploded structural view of FIG. 2.

In one embodiment, a double-end laser rangefinder, as shown in FIGS. 2-4, includes a ranging board 602 configured for controlling emitting and receiving laser light, a control board 604 configured for processing data and controlling displaying information on a screen 422 and a key board 606 configured for processing and outputting signals generated by pressing keys 412. The ranging board 602, the control board 604 and the key board 606 are integrated all together to form a mainboard 600. It should be noted that the ranging board 602, the control board 604, and the key board 606 may also be formed separately, respectively, in other embodiments. Through such a design, cable connection and board installation can be simplified, welding is reduced, and cable connections between the ranging board 602, the control board 604 and the key board 606 are replaced by the wires printed on the circuit board, resulting in better connection efficiency.

The double-end laser rangefinder further includes a mainboard 600, a one-piece optical mechanism 700 and two lens groups 800, all of which are mounted to a main frame 500. The one-piece optical mechanism 700 includes a first end 710 and a second end 720. The one-piece optical mechanism 700 includes two lasers 730 mounted at the first end 710 and the second end 720 respectively. Preferably, the one-piece optical mechanism 700 is integrally formed by injection molding, that is, the first end 710 and the second end 720 are integrally formed by injection molding. Through such a design, the inconvenient ranging of traditional single-end rangefinders is overcome, the long-term stability of the optical system is improved by means of the rigidity and tenacity of material of the main frame 500 replacing the viscidity of a thin layer of glue. In a traditional split-type double-end laser rangefinder, two light mechanisms are separately mounted on two main frames and workers needs to manually adjust the coaxiality of the optical axis of each light mechanism. While in the present application, under the condition that mould accuracy is guaranteed, manually adjustment of the optical axis of each light mechanism is not needed any more, which improves the assembly and production efficiency.

Figure 5:
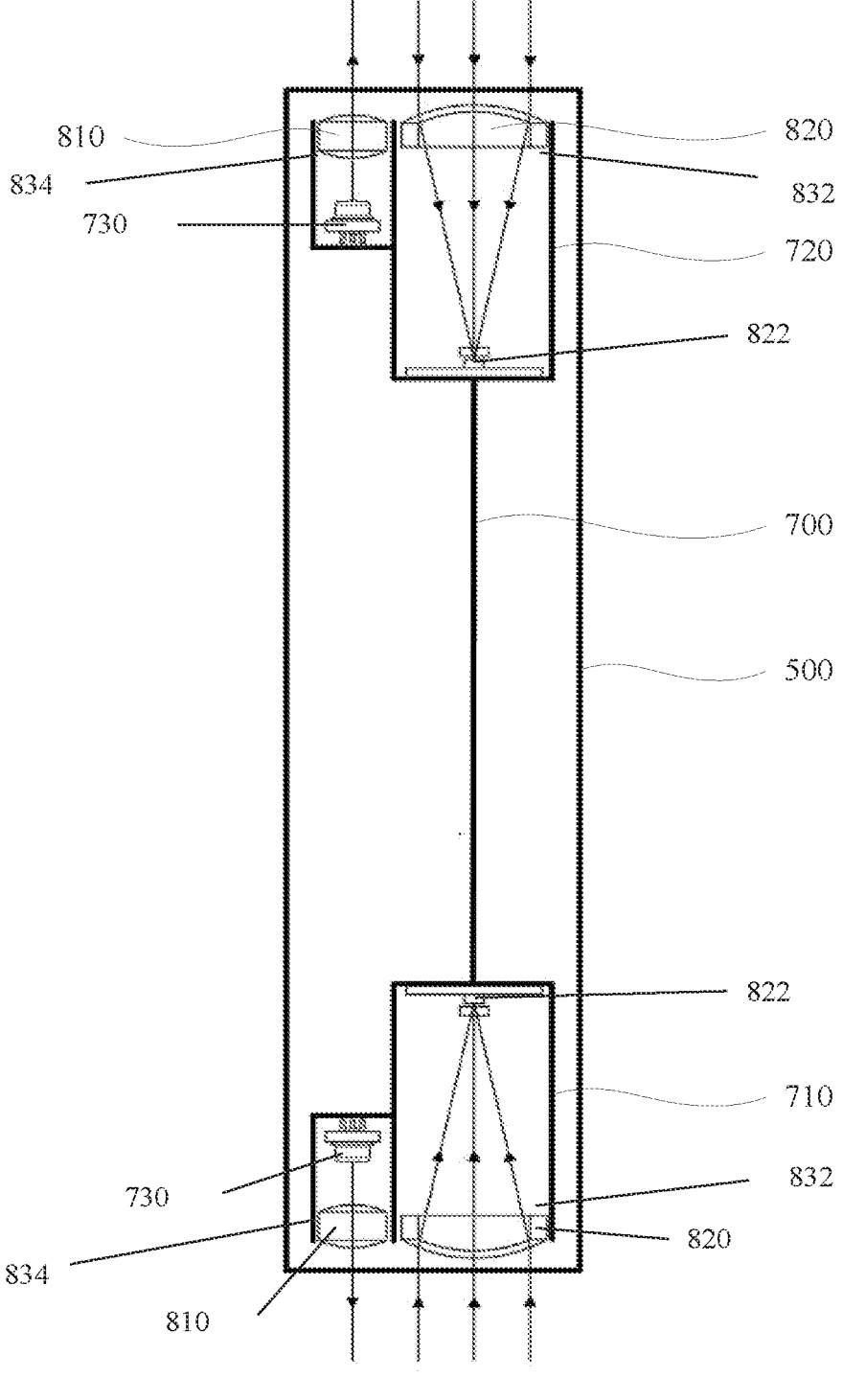
FIG. 5 is a schematic diagram of light paths of the double-end laser rangefinder according to an embodiment of the application.

Referring to FIG. 5, the first end 710 and the second end 720 are coaxially mounted in the main frame 500, such that their coaxial arrangement of light paths is naturally realized by the main frame 500. Through such a design, the difficulty of coaxial arrangement of light paths is lowered, focusing and coaxial arrangement of light paths can be completed at one time, and the assembly efficiency and the yield rates are improved.

Figure 6:
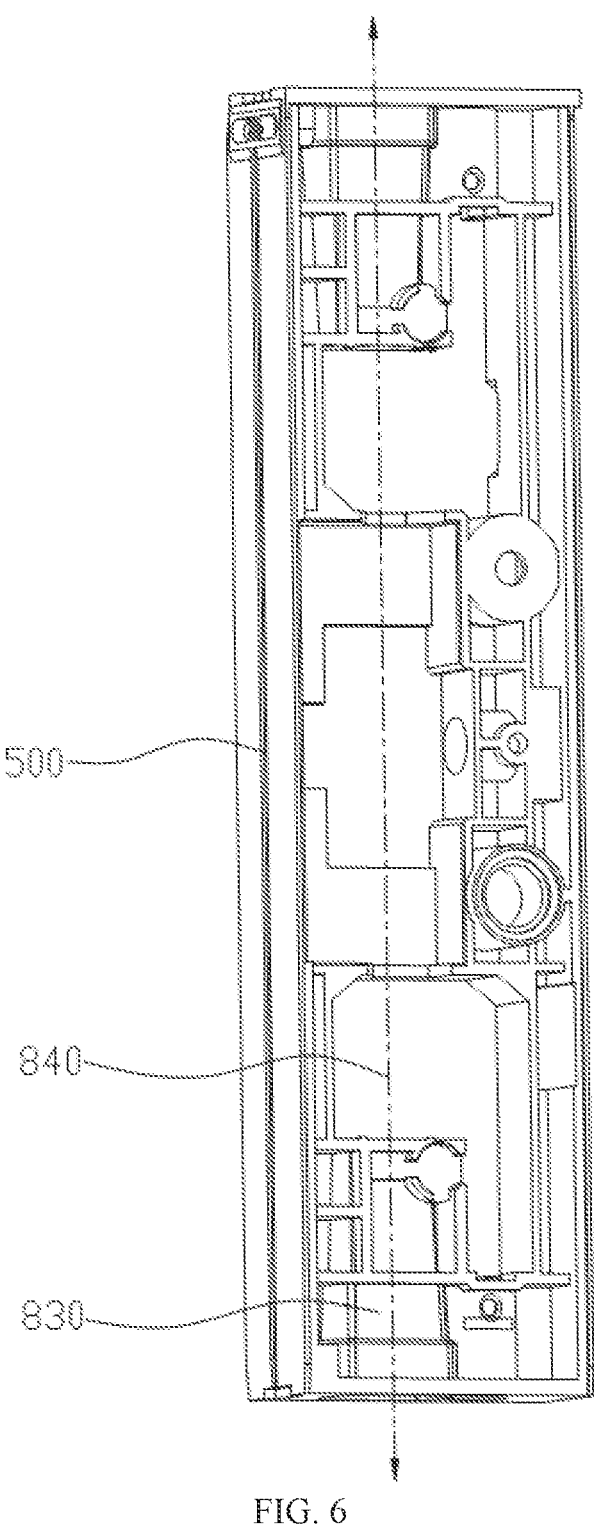
FIG. 6 is a schematic diagram of coaxial arrangement of light paths of the double-end laser rangefinder realized through a main frame according to another embodiment of the application.
Figure 7:
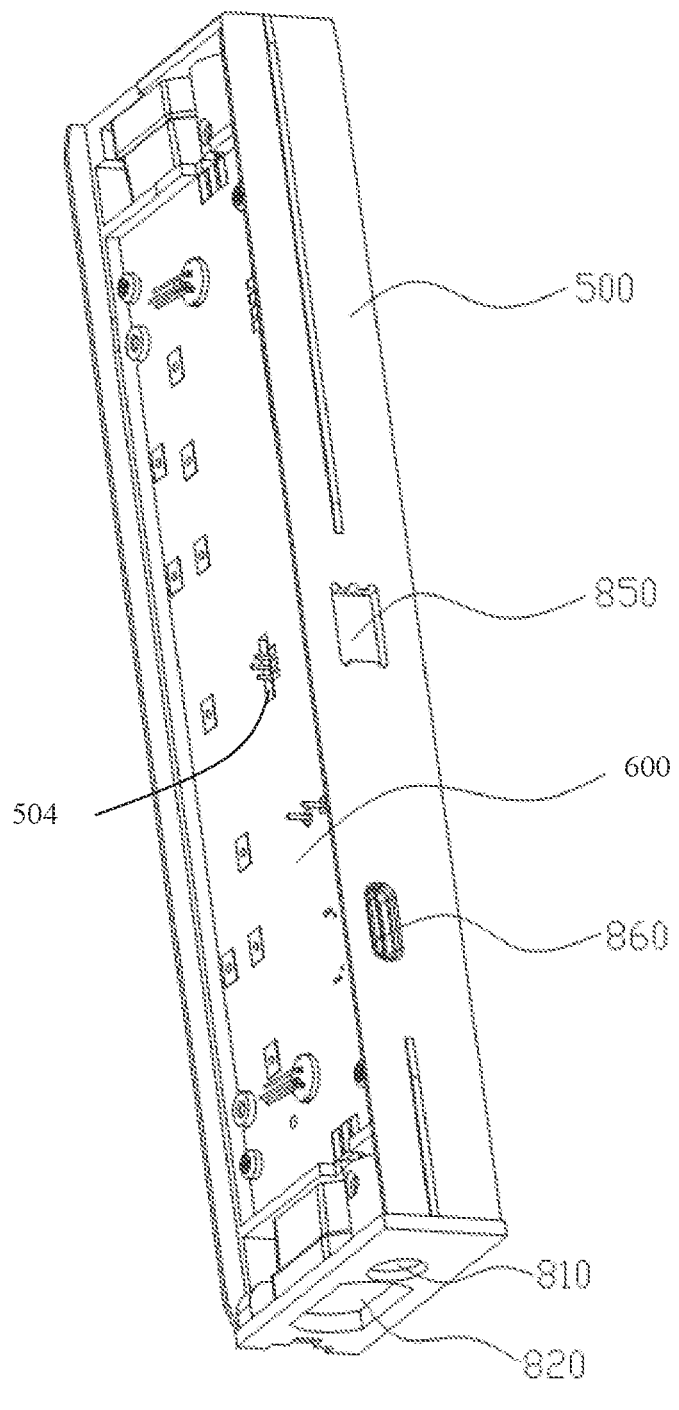
FIG. 7 is a partial structural diagram of the double-end laser rangefinder according to another embodiment of the application.
Figure 8:
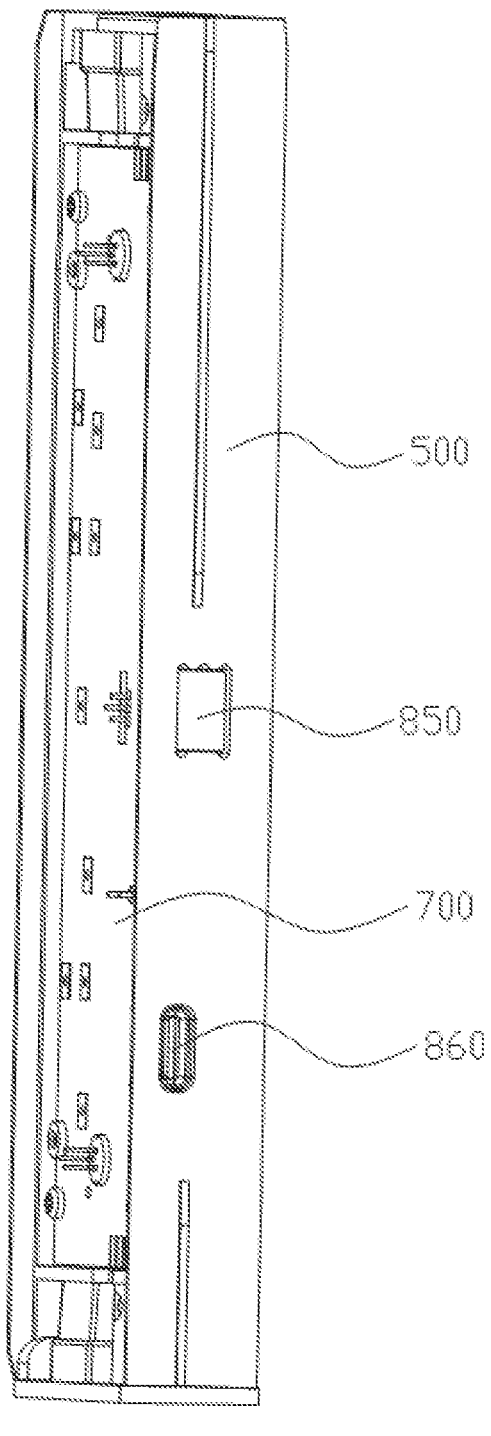
FIG. 8 is similar to FIG. 7, but viewed in another aspect.

Referring to FIG. 4, FIG. 5 and FIG. 6, two lens-mounting bases 830 are coaxially disposed in the main frame 500, and the two lens groups 800 are respectively mounted in the two lens-mounting bases 830. Each of the two lens-mounting bases 830 includes a first mounting space 832 and a second mounting space 834. The first mounting space 832 of the two lens-mounting bases 830 are coaxial with each other. The second mounting space 834 of the two lens-mounting bases 830 are coaxial with each other. The two lasers 730 are accommodated in the second mounting spaces 834 respectively. Each lens group 800 includes a transmitting lens 810 accommodated in a corresponding second mounting space 834 and a receiving lens 820 accommodated in a corresponding first mounting space 832. The transmitting lens 810 accommodated in the second mounting space 834 is coaxial with the laser 730 and configured for transmitting the laser light emitted by the laser 730. A light receiver 822 located at the optical axis of the receiving lens 820 is accommodated in the first mounting space 832 and configured for receiving part of the laser light reflected from an object to be measured. Coaxial arrangement of light paths of the two transmitting lenses 810 and the two receiving lenses 820 is realized through the main frame 500/the one-piece optical mechanism 700. That is, light paths of the first end 710 and the second end 720 are located on a same optical axis 840. That is, the two transmitting lenses 810 are arranged coaxially, and the two receiving lenses 820 are also arranged coaxially, respectively. In the embodiments of the application, the transmitting lens 810 includes a single transmitting lens, or a combination of multiple transmitting lenses, which is also referred to a transmitting lens group. Similarly, the receiving lens 820 includes a single receiving lens, or a combination of multiple receiving lenses, which is also referred to a receiving lens group. Through the design that the first end 710 and the second end 720 are coaxially mounted on the main frame 500 as shown in FIG. 3, coaxial arrangement of light paths is realized through the main frame 500, the difficulty of coaxial adjustment is lowered, focusing and coaxial arrangement of light paths can be completed at same time, the assembly process is greatly simplified, and the production efficiency and yield rate are improved. Moreover, the ranging board, the control board and the key board are integrated to a single part, so there is only one circuit board, namely the mainboard 600, in the main frame; and wire welding used in the prior art is replaced with wire arrangement on the circuit board, such that signals can be transmitted more directly, the spatial arrangement is more compact, and ranging is more accurate due to less signal delay and noise when cable connections removed. The mainboard 600 is supported on one side of frame 500. The mainboard 600 includes two opposite ends each of which at least partly covers a corresponding one of the mounting bases 830.

In the embodiment, the main frame 500 is integrally formed in order to improve the measurement accuracy. In some embodiments, the one-piece optical mechanism 700 and the main frame 500 are integrally formed as a one-piece structure. In one embodiment, the one-piece optical mechanism 700 and the main frame 500 of the double-end laser rangefinder are integrally formed as a one-piece structure through a plastic mold, for example, the one-piece optical mechanism 700 and the main frame 500 are integrally formed by injection molding. Further, in some embodiments, the one-piece optical mechanism 700 and the main frame 500 are formed, and during forming of the one-piece optical mechanism 700 and the main frame 500, coaxial arrangement of light paths is realized through structural positioning. After the one-piece optical mechanism 700 and the main frame 500 are formed for test production, the coaxial state can be detected and improved if needed, and henceforth fixed for later mass production. Through such a design, coaxial adjustment of the traditional split-type light mechanisms when they are in mass production and in use is omitted for present application's one piece double-end laser rangefinder, and the optical devices received in the mounting spaces of the one-piece optical mechanism 700 at two ends can be kept coaxial during long-term use. Thus, the measurement accuracy is improved. For a traditional split-type rangefinder, the focal lengths of two independent light mechanisms of the traditional split-type rangefinder are adjusted separately, then the two light mechanisms are mounted on a rectangular main frame, and then the coaxiality of the two light mechanisms is fine adjusted, so the assembly process is complex and time-consuming. Two independent ranging circuit boards are electrically connected to one control board, cable connection wires between the three circuit boards are complex, the welding workload is large, and measurement signal delays and signal errors may be caused by the complex cable connection. Different from the traditional split-type rangefinder, in the embodiments of the present application, two light mechanism ends 710/720 of the double-end laser rangefinder, also referred to as integrated double-end laser rangefinder, are integrally formed in the same mold, so the coaxiality of the two light mechanism ends, which is the key point affecting the yield and assembly efficiency when the double-end rangefinder is manufactured, is easily, stably and reliably guaranteed. In addition, in the embodiments of the application, mounting spaces rather than glue can be used for bearing force to fix optical devices, or both mounting spaces and glue can be used for bearing force to fix optical devices, which greatly reduces the fixing instability caused by glue aging during long-term use thus avoids the reduction of the measurement accuracy.

To realize overall assembly, in one embodiment, the double-end laser rangefinder, as shown in FIG. 2, further includes a shell 400 which encircles the main frame 500. The two lens groups 800 are exposed from the shell 400. In one embodiment, the shell 400 is mounted on the main frame 500 and encircles the main frame 500. The display screen is assembled on the shell 400 and is mounted to the main frame 500 through the shell 400. In the embodiment, the shell 400 is formed with key holes 410 and a screen hole 420. The double-end laser rangefinder is provided with keys 412 assembled in the key holes 410 and a display screen 422 assembled in the screen hole 420, and the keys 412 and the display screen 422 are electrically connected to the mainboard 600. In one embodiment, the keys 412 are electrically connected to the mainboard 600 directly. Or, in an alternative embodiment, the keys are electrically connected to the mainboard 600 indirectly. For example, the keys 412 may be conductive elastic elements mechanically connected to the mainboard 600, and when the keys 412 are pressed, the elastic elements are forced to touch a conductive substrate to thereby connect an upper circuit, which is connected to the elastic elements, and a lower circuit, which is connected to the conductive substrate. It can be understood that the number of the key holes 410 and the number of the keys 412 can be more than one, such that a multi-functional double-end laser rangefinder is provided. In some embodiments, the double-head laser rangefinder includes a ranging board, a control board, a key board, a shell 400, a main frame 500, a one-piece optical mechanism 700 and two lens groups 800, wherein the ranging board, the control board and the key board are integrated to form a mainboard 600 which is mounted to the main frame 500. The one-piece optical mechanism 700 includes a first end 710 and a second end 720 which are coaxially mounted to the main frame 500, such that coaxial arrangement of light paths is realized through the main frame 500. The main frame 500 is provided with two coaxial lens mounting bases 830, and the two lens groups 800 are mounted in the two lens mounting bases 830 respectively. Each lens group 800 includes a transmitting lens 810 and a receiving lens 820, and coaxial arrangement of light paths of the two transmitting lenses 810 and the two receiving lenses 820 is realized through the main frame 500. The shell 400 encircles the main frame 500 with the lens groups 800 being exposed from the shell 400. The shell 400 is formed with key holes 410 and a screen hole 420. The double-end laser rangefinder is provided with keys assembled in the key holes 410 and a display screen assembled in the screen hole 420, and the keys and the display screen are electrically connected to the mainboard 600. Other embodiments can be implemented in a similar way and will not be detailed.

To realize overall assembly and improve the protection effect, in some embodiments, the double-end laser rangefinder, as shown in FIG. 2, further includes a shell cover 430 which is disposed over the shell 400 to enclose the mainboard 600. The display screen may be mounted under the shell cover 430 or under the shell 400. Contents displayed by the display screen can be seen from outside through the shell cover 430. Through such a design, the structure of the main frame 500 can be protected to ensure the structural stability of the main frame 500 during long-term use; and the mainboard 600 formed by the ranging board, the control board and the key board can be well protected from being damaged due to falling or collisions in use.

Figure 9:
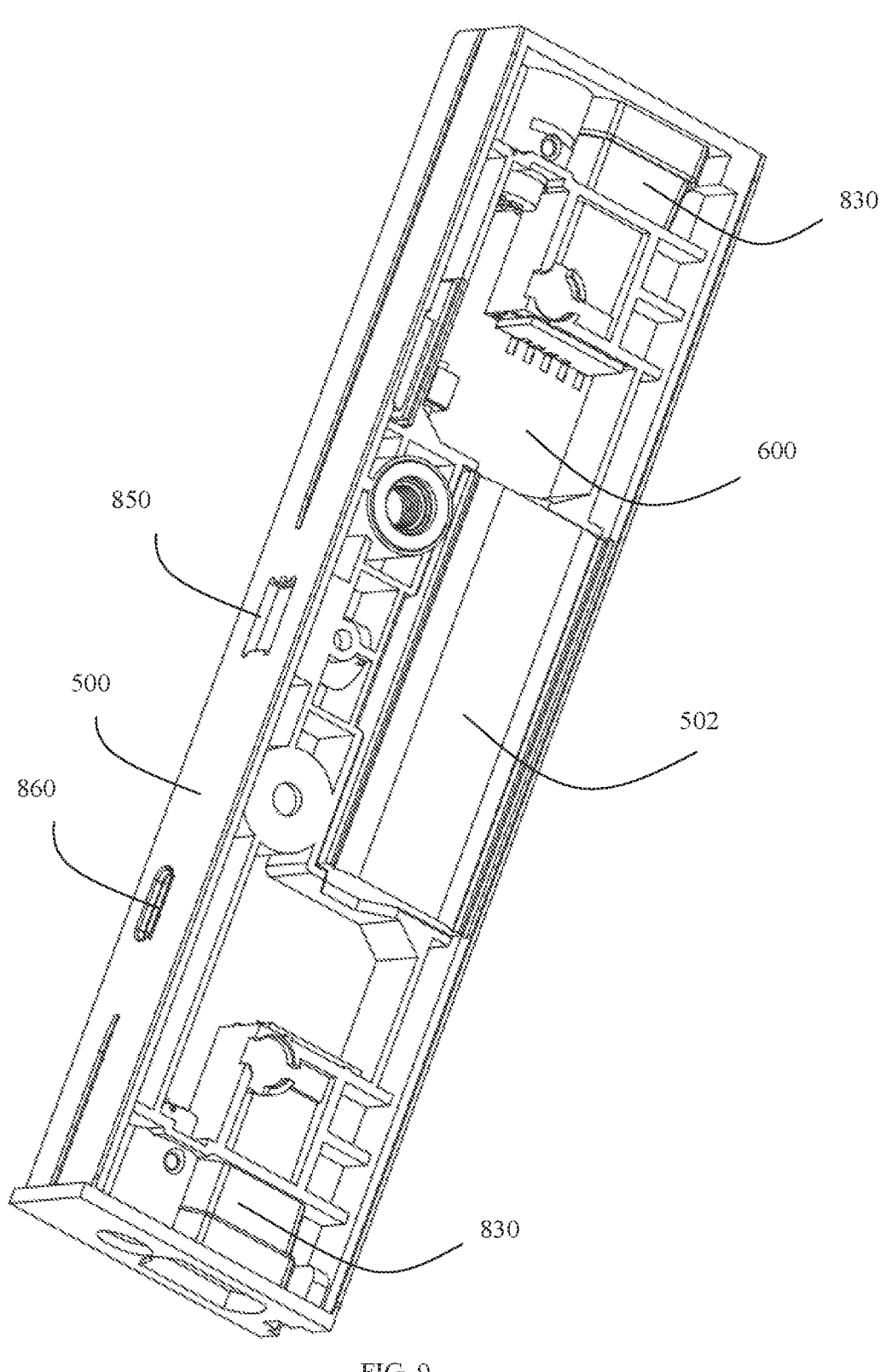
FIG. 9 illustrates the back side of the double-end laser rangefinder of FIG. 7.

Referring to FIG. 9, to fulfil a power supply function, in some embodiments, the double-end laser rangefinder further includes a battery module 502 disposed in the main frame 500, a conductive cable or contactor 504 connected to the battery module 502 is disposed on the mainboard 600, and a charging port 860 connected to the conductive cable or contactor 504 is disposed on the shell 400 of the double-end laser rangefinder. Preferably, the battery module 502 is located between the two lens mounting bases 830. The keys 412 and the screen 422 are located at one side of the mainboard 600 while the battery module 502 is located at an opposite side of the mainboard 600. Further, an indicator light module connected to the battery module 502 through the conductive cable (504) is disposed on the shell 400 of the double-end laser rangefinder. Through such a design, power supply and re-charging can be realized.

To improve the anti-falling and anti-collision effect, in some embodiments, an anti-falling silicone protruding part

402 is disposed on the shell 400. Further, in some embodiments, the anti-falling silicone protruding part 402 includes a silicone sleeve and/or a plurality of protrusions. In one embodiment, the shell 400 has an overall rectangular shape, that is, the shell 400 is in a rectangular shape or is in a shape of the combination of the rectangular shape and other shapes, such as filleted-corner cuboid or a clipped-corner cuboid. In some embodiments, an anti-falling silicone protruding part 402 is disposed on an outer surface of a sidewall of the shell 400, and the shell 400 is in a rectangular shape. Other embodiments can be implemented in a similar way and will not be detailed. Such a design can help to keep light mechanisms at two ends in a coaxial state even in tough cases, thus guarantees the measurement accuracy during long-term use.

To realize segmental marking, in one embodiment, the double-end laser rangefinder further includes a lateral positioning optical module which is mounted on the main frame 500, and an emergent direction of the lateral positioning optical module is perpendicular to a principal axis 840 formed by the first end 710 and the second end 720. That is, the emergent direction of the lateral positioning optical module is perpendicular to the lengthwise direction of the one-piece optical mechanism 700 extended from one of the first and second ends 710/720 to the other of the first and second ends 710/720. In one embodiment, the lateral positioning optical module includes a laser marking module 850. In one embodiment, the double-end laser rangefinder, as shown in FIG. 5 and FIG. 6, further includes a laser marking module 850 which is mounted on the main frame 500, and an emergent direction of the laser marking module 850 is perpendicular to the principal axis 840 formed by the first end 710 and the second end 720, or is perpendicular to an emergent direction of the first end 710 and the second end 720. In this embodiment, an emergent position of the laser marking module 850 is located in the middle of the main frame 500. In one embodiment, the laser marking module 850 emitting visible laser light laterally is disposed in the middle portion of the main frame 500, and is used for projecting a visible laser marking line to a plane in a scenario requiring distance segmenting such as wall layout for art exhibition, assembly layout of production lines, and allocation and marking of the occupation proportion of objects, such that the double-end laser rangefinder can be used more conveniently in more applications.

Figure 10:
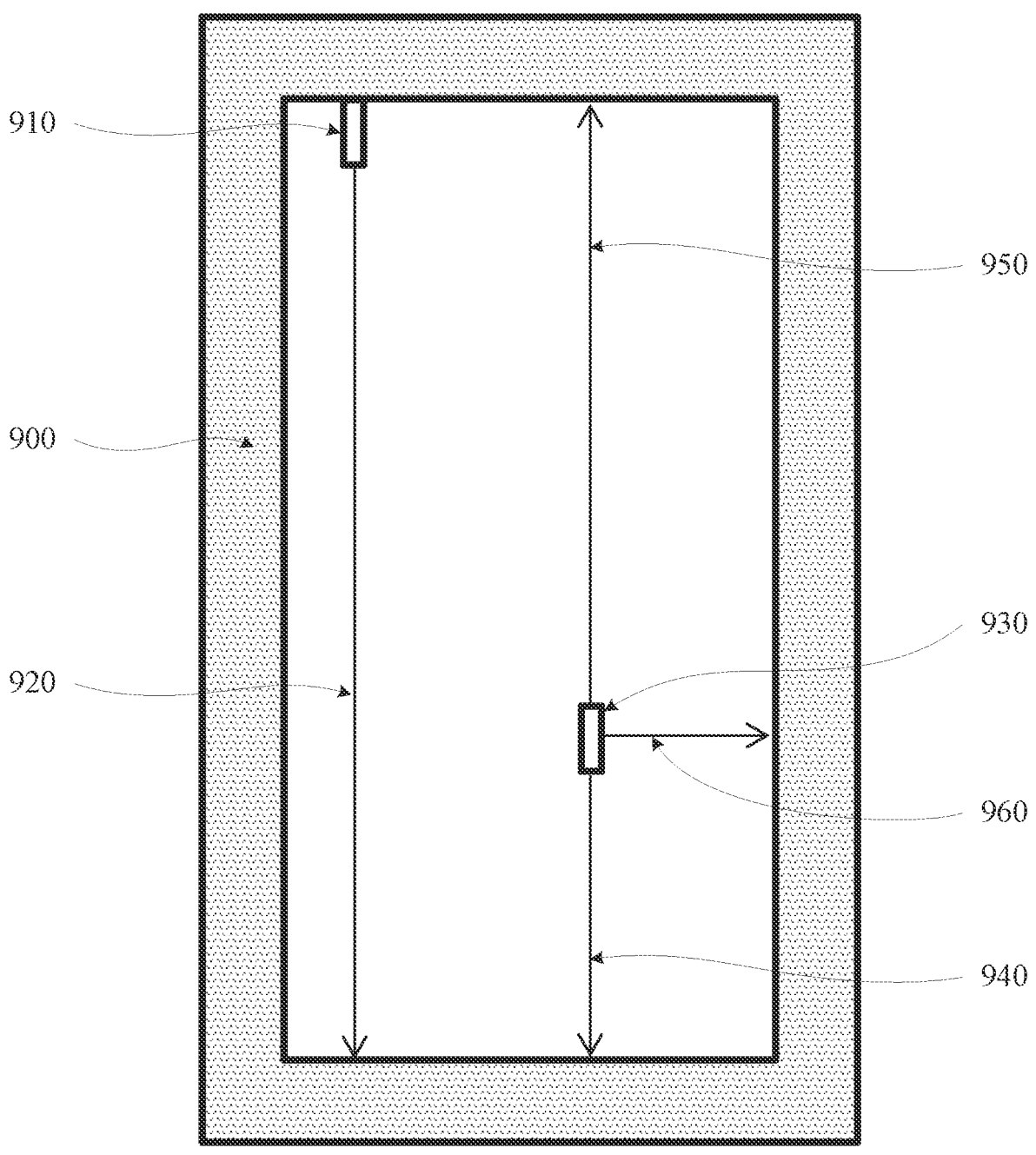
FIG. 10 is an application comparison diagram of a traditional single-end rangefinder and the double-end laser rangefinder according to one embodiment of the application.

FIG. 10 shows an application comparison diagram when a traditional single-end rangefinder 910 and a double-end laser rangefinder 903 provided according to one embodiment of the application are used for ranging in a room 900 respectively. The double-end laser rangefinder 930 of the present application is of an integral structure, thus also being referred to as a double-end integrated rangefinder. During measurement, the tail of the single-end rangefinder 910 needs to abut against the wall to realize measurement through a first ranging laser light 920; the double-end laser rangefinder 930 provided by the application can be placed at any position in the room 900, and emits a second ranging laser light 940 and a third ranging laser light 950, the light paths of which are coaxial, to realize a quick and convenient measurement. Specifically, the second ranging laser light 940 and the third ranging laser light 950 emitted by the lasers 730 are transmitted via the transmitting lenses 810, and then reflected by the walls of the room 900 to the receiving lenses 820, and are finally received by the lighter receivers 822 which are connected to the control board 604. The double-end laser rangefinder 930 can also laterally emit a fourth ranging laser light 960 to realize segmental marking if needed; and the fourth ranging laser light 960 is emitted by the laser marking module. The light path, namely emergent direction, of fourth ranging laser light 960 is perpendicular to the light paths of the second ranging laser light 940 and the third ranging laser light 950, namely the optical axis mentioned above.

It should be noted that other embodiments of the application further include double-end laser rangefinders, which are formed by combining the technical features of the above embodiments, and can be implemented.

The technical features of the above embodiments can be combined freely. For the sake of brevity, not all possible combinations of the technical features of the above embodiments are described, and all non-contradictory combinations should be regarded as falling within the scope of this specification.

The above embodiments are merely express several implementations of the application, and are specifically described in detail, but they should not be construed as limitations of the patent scope of the application. It should be pointed out that various transformations and improvements can be made by those ordinarily skilled in the art without departing from the concept of the invention, and all these transformations and improvements fall within the protection scope of the application. Thus, the patent protection scope of the application should be defined by the appended claims.

What is claimed is:

1. A double-end laser rangefinder, comprising:
a main frame;
a mainboard mounted to the main frame;
a one-piece optical mechanism provided in the main frame, wherein the one-piece optical mechanism comprises a first end and a second end opposite to the first end, and the first end and the second end are integrally formed as a one-piece structure;
two lens-mounting bases, wherein one of the two lens-mounting bases is arranged on the first end, and the other of the two lens-mounting bases is arranged on the second end;
two lens groups mounted on the two lens mounting bases respectively, wherein the two lens groups are coaxial, and each of the lens groups comprises a transmitting lens configured for transmitting a laser light and a receiving lens configured for receiving the laser light; and
wherein the two lens mounting bases are integrally formed with the one-piece optical mechanism.

2. The double-end laser rangefinder according to claim 1, wherein the main frame is integrally formed as a one-piece structure.

3. The double-end laser rangefinder according to claim 2, wherein the one-piece optical mechanism and the main frame are integrally formed as a one-piece structure.

4. The double-end laser rangefinder according to claim 1, wherein the mainboard comprising a ranging module, a control module and a key module integrally formed as a one-piece structure.

5. The double-end laser rangefinder according to claim 1, further comprising a shell, wherein the shell encloses the main frame, and the two lens groups are exposed from the shell.

6. The double-end laser rangefinder according to claim 5, wherein a portion of the shell corresponding to the keyboard is formed with key holes, the double-head laser rangefinder is provided with keys assembled in the key holes, and the keys are electrically connected to the mainboard.

7. The double-end laser rangefinder according to claim 6, wherein the double-end laser rangefinder further comprises a shell cover which is disposed over the shell to enclose the mainboard.

8. The double-end laser rangefinder according to claim 5, wherein the shell is formed with a screen hole, the display screen is assembled in the screen hole, and the display screen are electrically connected to the mainboard.

9. The double-end laser rangefinder according to claim 5, wherein a battery module is disposed in the main frame, a conductive cable or contactor connected to the battery module is disposed on the mainboard, and a charging port electrically connected to the conductive cable or contactor is disposed on the shell of the double-head laser rangefinder.

10. The double-end laser rangefinder according to claim 5, wherein an anti-falling-silicone protruding part is disposed on the shell.

11. The double-end laser rangefinder according to claim 1, wherein the double-end laser rangefinder further comprises a lateral positioning optical module mounted on the main frame, and an emergent direction of the lateral positioning optical module is perpendicular to a lengthwise direction of the one-piece optical mechanism extended from one of the first and second ends toward the other of the first and second ends.

12. The double-end laser rangefinder according to claim 11, wherein the lateral positioning optical module comprises a laser marking module, and an emergent position of the laser marking module is located at a middle of the main frame.

13. The double-end laser rangefinder according to claim 1, wherein each of the two lens mounting bases comprises a first mounting space for accommodating the receiving lens(es) and a second mounting space for accommodating the transmitting lens(es), a laser being disposed in each of the second mounting spaces and coaxial with a corresponding one of the transmitting lenses; the receiving lenses of the two lens groups are coaxial with each other, the transmitting lenses of the two lens groups are coaxial with each other.

14. The double-end laser rangefinder according to claim 13, wherein the mainboard is supported on one side of the one-piece optical mechanism, and the mainboard comprises two opposite ends each of which at least partly covers a corresponding one of the mounting bases.

15. A double-end laser rangefinder, comprising:
a one-piece optical mechanism comprising a first end and a second end which are integrally formed as a one-piece structure, each of the first end and the second end being provided with a laser configured for emitting a ranging laser light;
two lens mounting bases being provided at the first end and the second end respectively;
two lens groups mounted in the two lens mounting bases respectively; and
wherein each of the lens groups comprises a transmitting lens and a receiving lens, the receiving lenses of the two lens groups are coaxial with each other, and the transmitting lenses of the two lens groups are coaxial with each other.

16. The double-end laser rangefinder according to claim 15, wherein the two lens mounting bases are integrally formed with the one-piece optical mechanism.

17. The double-end laser rangefinder according to claim 15, wherein each of the two lens mounting bases comprises a first mounting space for accommodating a corresponding one of the receiving lenses and a second mounting space for accommodating a corresponding one of the transmitting lenses;

the first mounting spaces of the two lens mounting bases are coaxial with each other;

the second mounting spaces of the two lens mounting bases are coaxial with each other; and each of the lasers is coaxial with a corresponding one of the transmitting lenses.

18. The double-end laser rangefinder according to claim 17, further comprising a light receiver located at an optical axis of each of the receiving lens, wherein the light receiver is electrically connected to the mainboard.

19. The double-end laser rangefinder according to claim 15, further comprising a ranging board configured for controlling emitting and receiving the ranging laser light, a control board configured for processing data and controlling displaying information on a screen, and a key board configured for processing and outputting signals generated by pressing keys, wherein the ranging board, the control board and the key board are integrated to form a single mainboard.

20. The double-end laser rangefinder according to claim 19, further comprising a main frame, wherein the one-piece optical mechanism is disposed in the main frame, the mainboard is covered on the one-piece optical mechanism, and the one-piece optical mechanism and the main frame are integrally formed as a one-piece structure.

\* \* \* \* \*